United States Patent [19]

Bouverot et al.

[11] 4,384,068

[45] May 17, 1983

[54] PASTY ORGANOPOLYSILOXANE COMPOSITIONS THERMOSETTING INTO ELASTOMERS

[75] Inventors: Noël Bouverot, Saint Symphorien D'Ozon; Paul Médard, Oullins; Alain Viale, Venissieux, all of France

[73] Assignee: Rhone-Poulenc Industries, Paris, France

[21] Appl. No.: 337,843

[22] Filed: Jan. 7, 1982

[30] Foreign Application Priority Data

Jan. 7, 1981 [FR] France ................................. 81 00115

[51] Int. Cl.$^3$ .............................................. C08K 3/34
[52] U.S. Cl. ..................................... 524/493; 523/220; 524/588; 524/847; 524/730
[58] Field of Search ................ 523/220; 524/493, 588, 524/847, 730

[56] References Cited

U.S. PATENT DOCUMENTS 3,865,778  2/1975  Christie ............................... 523/220
4,033,924  1/1977  Mine et al. ............................ 528/24
4,230,820 10/1980  Maschberger ....................... 524/493

*Primary Examiner*—Melvyn I. Marquis
*Attorney, Agent, or Firm*—Burns, Doane, Swecker & Mathis

[57] ABSTRACT

Pasty organopolysiloxane compositions having a penetration of from 80 to 400 and which can be thermoset into elastomers having good mechanical properties, are comprised of an intimate admixture of (i) 100 parts by weight of a diorganopolysiloxane oil having a viscosity of from 500 to 300,000 mPa·s at 25° C., (ii) 7 to 85 parts by weight of reinforcing silicas having a specific surface area of at least 50 m$^2$/g, said reinforcing silicas comprising from 55 to 95% precipitated silica and 5 to 45% pyrogenic silica, (iii) 1 to 20 parts by weight of a structuring inhibitor, and (iv) 0.1 to 4 parts by weight of an organic peroxide cross-linking agent.

9 Claims, No Drawings

PASTY ORGANOPOLYSILOXANE COMPOSITIONS THERMOSETTING INTO ELASTOMERS

CROSS-REFERENCE TO RELATED APPLICATION

Our copending application, Ser. No. 337,844, filed concurrently herewith and assigned to the assignee hereof.

BACKGROUND OF THE INVENTION

1. Field of the Invention

The present invention relates to pasty organopolysiloxane compositions, and, more especially, to such compositions which can be readily transferred or circulated by means of pumps, comprising organic peroxide cross-linking agents and which can be conveniently thermoset to form elastomers possessing good mechanical properties.

2. Description of the Prior Art

Pasty organopolysiloxane compositions consisting of diorganopolysiloxane oils, fillers and organic peroxides, and which can be subjected to thermosetting to form elastomers, are described in U.S. Pat. No. 3,791,998. The objective of this patent is to obtain, in a simple manner, good adhesion between the organopolysiloxane elastomers and fabrics which are to be used as insulators for electrical conductors; this objective is achieved by the use of compositions which are sufficiently plastic to penetrate into the mesh of the fabrics. Thus, said patent does not suggest any method for obtaining elastomers possessing good mechanical properties from pasty organopolysiloxane compositions.

Organopolysiloxane compositions which can have a sufficiently low viscosity to be circulated, and then harden to form elastomers, in low-pressure molding devices or apparatus (such as the so-called liquid injection-molding machines), are described in U.S. Pat. No. 4,173,560. Same consist of diorganopolysiloxane oils having, per mol, about 2 vinyl radicals bonded to the silicon atoms, finely divided silicas treated with vinylic amidoorganopolysiloxanes, and, as cross-linking agents, organic peroxides or more complex systems comprising combinations of organohydrogenopolysiloxanes and platinum derivatives.

These compositions harden to form elastomers having proper mechanical properties; however, the treatment of the finely divided silicas entails the use of organopolysiloxane compounds which are not readily available on the silicone market; moreover, the examples in the patent reflect that, in order to pursue this treatment, it is first necessary to dry the finely divided silicas for a prolonged period of time and then to carry out the process in an anhydrous solvent medium.

U.S. Pat. No. 4,173,560 also teaches (column 7, Example 1A and column 8, Example 3) that the usual treatment of the silicas by means of organosilicon compounds which donate $(CH_3)_3SiO_{0.5}$ groups, such as hexamethyldisilazane, leads to elastomers possessing mechanical properties which are on the whole inferior (in particular from the point of view of Shore A hardness) to those of the elastomers produced from compositions containing silicas treated with the vinylic amidoorganopolysiloxanes.

SUMMARY OF THE INVENTION

Accordingly, a major object of the present invention is the provision of improved pasty organopolysiloxane compositions comprising finely divided silicas which are either untreated or which have been partially treated with organosilicon compounds which are readily available on the silicone market, said improved organopolysiloxane compositions being readily thermoset to provide elastomers possessing good mechanical properties.

Briefly, the subject pasty compositions which are characterized by a penetration ranging from 80 to 400 (measured in accordance with French Standard Specification T 60-132), are conveniently constituted by intimately admixing the following constituents (the parts and percentages are expressed by weight):

(A) 100 parts of a diorganopolysiloxane oil having a viscosity of 500 to 300,000 mPa·s at 25° C., consisting essentially of recurring units of the formula $R_2SiO$ and blocked at each end of the chain by units of the formula $R_2R'SiO_{0.5}$, in which formulae the symbols R, which are identical or different, represent hydrocarbon radicals which are unsubstituted or substituted by halogen atoms or cyano groups and which have 1 to 8 carbon atoms, and the symbol R' is defined exactly as were the symbols R and also represents a hydroxyl radical, an alkoxy radical having from 1 to 4 carbon atoms or a β-methoxyethoxy radical;

(B) 7 to 85 parts of finely divided, reinforcing silicas having a specific surface area of at least 50 m²/g;

(C) 1 to 20 parts of structuring inhibitors; and (D) 0.1 to 4 parts of organic peroxide cross-linking agents.

DETAILED DESCRIPTION OF THE INVENTION

More particularly according to this invention, the subject compositions feature an amount of reinforcing silica B comprising from 55 to 95% of precipitated silicas and from 45 to 5% of pyrogenic silicas, with these silicas either being untreated or treated (but in a proportion of at most 60% and preferably of at most 55%) with commercially available organosilicon compounds providing units selected from among those of the formulae $(CH_3)_2SiO$, $(CH_3)(CH_2=CH)SiO$, $(CH_3)_3SiO_{0.5}$ and $(CH_3)_2(CH_2=CH)SiO_{0.5}$.

The diorganopolysiloxane oils A having a viscosity of 500 to 300,000 mPa·s at 25° C. and preferably of 800 to 250,000 mPa·s at 25° C. are linear polymers consisting essentially of the aforementioned units of the formulae $R_2SiO$ and $R_2R'SiO_{0.5}$; however, it is also envisaged that same may comprise minor amounts, representing at most 1% by number, of units of the formulae $RSiO_{1.5}$ and/or $SiO_2$.

The hydrocarbon radicals which are unsubstituted or substituted by halogen atoms or cyano groups and which have from 1 to 8 carbon atoms, represented by the symbols R, include:

(i) alkyl and halogenoalkyl radicals having from 1 to 3 carbon atoms, such as methyl, ethyl, propyl, isopropyl and 3,3,3-trifluoropropyl radicals;

(ii) alkenyl radicals having from 2 to 4 carbon atoms, such as vinyl, allyl and but-2-enyl radicals;

(iii) cycloalkyl and halogenocycloalkyl radicals having from 5 to 6 nuclear carbon atoms, such as cyclopentyl, cyclohexyl, methylcyclohexyl and chlorocyclohexyl radicals;

(iv) mononuclear aryl and halogenoaryl radicals having from 6 to 8 carbon atoms, such as phenyl, tolyl, xylyl, chlorophenyl, dichlorophenyl and trichlorophenyl radicals; and (v) cyanoalkyl radicals of which the alkyl radicals have from 2 to 3 carbon atoms, such as β-cyanoethyl and γ-cyanopropyl radicals.

Specific examples of representative alkoxy radicals having from 1 to 4 carbon atoms, represented by the radicals R', are methoxy, ethoxy, n-propoxy, isopropoxy and n-butoxy radicals.

Exemplary of units essentially constituting the diorganopolysiloxane oils A, representative are, respectively, the units $(R)_2SiO$ of the formulae:

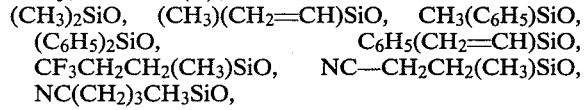

and the units $(R)_2R'SiO_{0.5}$ of the formulae:

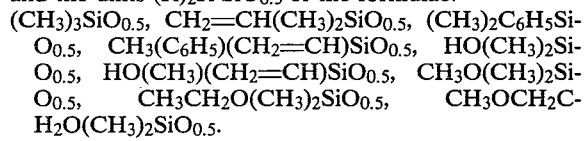

The diorganopolysiloxane oils A are widely marketed by silicone manufacturers; furthermore, they can easily be prepared utilizing techniques already well known to this art. Thus, one of the more common techniques consists of polymerizing diorganocyclopolysiloxanes using catalytic amounts of alkaline or acid agents. The following are added to the reaction mass during this polymerization:

(1) (if R'=R), low molecular weight diorganopolysiloxanes of the formula $R_3SiO(R_2SiO)_x$-$SiR_3$, x having a value sufficient to provide a viscosity ranging from 0.5 to 100 mPa·s at 25° C.;

(2) (if R'=OH), water and/or an oil of the formula $HOR_2SiO(SiR_2O)_ySuR_2OH$, y having a value sufficient to provide a viscosity ranging from 5 to 200 mPa·s at 25° C.; and (3) (if R'=alkoxy or $CH_3OCH_2CH_2O$), the corresponding alcohol R'H and/or a low molecular weight oil of the formula $R'R_2SiO(R_2SiO)_zSiR_2R'$, z having a value sufficient to provide a viscosity ranging from 0.5 to 120 mPa·s at 25° C.

The polymers obtained are preferably purified by removing, at a temperature which is typically above 70° C. and under a pressure which is typically below atmospheric pressure, the unconverted starting compounds present when the polymerization reaction is at equilibrium, and also the low molecular weight polymers which may have been formed during this reaction. It is recommended to neutralize the alkaline or acid agents used as polymerization catalysts, prior to distilling the volatile products.

The silicas B are used in amounts of 7 to 85 parts and preferably 10 to 80 parts per 100 parts of the diorganopolysiloxane oils A. Same consist of two types of silicas:

(i) precipitated silicas representing 55 to 95% and preferably 60 to 90% of the silicas B, and (2i) pyrogenic silicas representing the remainder to 100%, namely, 45 to 5% and preferably 40 to 10% of the silicas B.

The above-mentioned proportions by weight of the two types of silicas characterize the compositions according to the invention. They contribute fully, on the one hand, to obtaining the desired penetration ranging from 80 to 400, and, on the other hand, to imparting to the elastomers produced from the compositions, good mechanical properties.

The precipitated and pyrogenic silicas used are those marketed by manufacturers of inorganic fillers; they have a specific surface area (measured in accordance with the BET method) of at least 50 m²/g, preferably of more than 80 m²/g and capable of exceeding 350 m²/g, an average size of the primary particles of less than 80 nm and a bulk density of less than 250 g/liter.

However, such silicas differ in their method of manufacture. The precipitated silicas result from the acidification of aqueous solutions of alkali metal silicates and, in contrast to the pyrogenic silicas, they are most frequently porous and possess a substantially higher proportion of surface OH groups. Details on processes for their preparation and their physical characteristics are included in U.S. Pat. Nos. 4,059,558 and 4,208,316 and French Pat. No. 2356596.

The pyrogenic silicas result from the hydrolysis of chlorosilanes and more particularly of tetrachlorosilane, at temperatures above 800° C., in a flame which generates steam obtained by the combustion of hydrogen and/or hydrocarbon compounds in air or oxygen. Details of the processes for their preparation and their physical characteristics are included in French Pat. Nos. 1,007,493, 1,074,265 and U.S. Pat. No. 4,067,954.

These silicas can be used as such, which is preferable in view of the fact that this is the least expensive alternative, or alternatively they can be used after having been treated with organosilicon compounds normally employed for this purpose and readily available on the chemical products market; however, not all of the filler used, but at most 60% and preferably 55%, is treated. The compounds used for treating the fillers are represented, for example, by methylpolysiloxanes such as hexamethyldisiloxane and octamethylcyclotetrasiloxane, methylpolysilazanes such as hexamethyldisilazane and hexamethylcyclotrisilazane, chlorosilanes such as dimethyldichlorosilane, trimethylchlorosilane, methylvinyldichlorosilane and dimethylvinylchlorosilane, and alkoxysilanes such as dimethyldimethoxysilane, trimethylmethoxysilane, trimethylethoxysilane and dimethylvinylethoxysilane.

During this treatment, the aforesaid organosilicon compounds become attached to the surface of the silicas and/or react with such surface, in particular with the hydroxyl groups borne thereby. This results in the provision of units selected from the group consisting of those of the formulae $(CH_3)_2SiO$, $(CH_3)(CH_2=CH)SiO$, $(CH_3)_3SiO_{0.5}$ and $(CH_3)_2(CH_2=CH)SiO_{0.5}$. The treated silicas can thus increase their initial weight by a percentage ranging up to 20% and in general up to 15%.

The structuring inhibitors C are used in amounts of 1 to 20 parts and preferably 2 to 15 parts per 100 parts of the diorganopolysiloxane oils A. Their presence prevents the compositions from changing with time, a change generally resulting in a decrease in the value of the penetrations.

Exemplary such structuring inhibitors comprise:

(i) diorganopolysiloxane oils having low viscosities on the order of 5 to 500 mPa·s at 25° C. and blocked at each end of their chain by a hydroxyl radical and/or an alkoxy radical having from 1 to 3 carbon atoms. The organic radicals bonded to the silicon atoms in these oils are preferably methyl, ethyl, vinyl, phenyl or 3,3,3-trifluoropropyl radicals.

Specific examples of these oils which are representative are α,ω-dihydroxydimethylpolysiloxane, α,ω-dihydroxymethylphenylpolysiloxane, α,ω-dimethoxydimethylpolysiloxane and α,ω-dimethoxymethylphenylpolysiloxane oils containing from 3 to 12% of hydroxyl or methoxy radicals.

(ii) diphenylsilanediol and the silanes of the formulae:

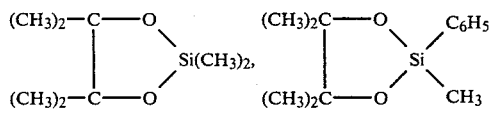

The cross-linking agents D are employed in amounts of 0.1 to 4 parts and preferably 0.15 to 3.5 parts per 100 parts of the diorganopolysiloxane oils. These are organic peroxides normally used for hardening, or curing silicone elastomers vulcanized under the action of heat. These peroxides include, more especially, benzoyl peroxide, 2,4-dichlorobenzoyl peroxide, dicumyl peroxide, 2,5-bis-(t-butylperoxy)-2,5-dimethylhexane, t-butyl perbenzoate, di-t-butylperoxide, cumyl t-butyl peroxide, t-butylperoxy isopropyl carbonate, 1,1-bis(t-butylperoxy)-3,3,5-trimethylcyclohexane, cumyl α,α-dimethyl-p-methylbenzyl peroxide and α,α'-bis-(t-butylperoxy)-diisopropylbenzene.

The temperatures and rates at which these peroxides decompose are sometime different. Such peroxides will therefore be selected as a function of the hardening technique adopted for the compositions according to the invention.

Other substances apart from the constituents A, B, C and D can be incorporated into the compositions according to the invention. Thus, coarser inorganic fillers having a particle diameter of more than 0.1μ can be combined with the finely divided silicas B. These fillers are represented, for example, by ground quartz, calcined clays, diatomaceous silicas, calcium carbonate and the oxides of iron, titanium, magnesium and aluminum.

These particular constituents are introduced in amounts of at most 120 parts and preferably 100 parts per 100 parts of the diorganopolysiloxane oils A. These fillers can be used as such or after they have been treated with the organosilicon compounds already mentioned for the treatment of the finely divided silicas B.

Pigments, heat stabilizers (such as iron carboxylates and manganese carboxylates) and combustion retarders, such as platinum derivatives, can also be incorporated.

Such platinum derivatives (which are typically selected from among chloroplatinic acid and the complexes or the reaction products of this acid or of other platinum chlorides with organic or organosilicon derivatives) are preferably combined with cerium oxides and hydroxides, or pyrogenic titanium/iron oxides. Combinations of this type, and their introduction into the organopolysiloxane compositions undergoing thermosetting to form elastomers, are described, in particular, in U.S. Pat. Nos. 3,635,874, 3,821,140 and French Pat. No. 2203846.

Other adjuvants can also be used for the purpose of improving the mechanical properties and the adhesion to various substrates. These adjuvants include, for example, the silanes of the formulae below and their products of partial hydrolysis or of partial co-hydrolysis:

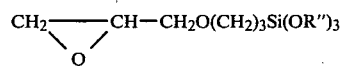

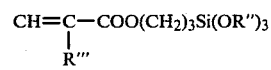

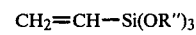

The symbols R" represent methyl, ethyl, n-propyl or β-methoxyethyl radicals; the symbol R''' represents a hydrogen atom or the methyl radical.

Specific examples of these silanes which are representative are those of the formulae:

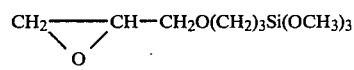

These adjuvants are used in amounts of 0.05 to 5 parts and preferably 0.1 to 4 parts per 100 parts of the diorganopolysiloxane oils A.

The compositions according to the invention are prepared by intimately mixing the various constituents A, B, C and D and, if appropriate, the other substances and adjuvants mentioned above. This mixing is carried out in any suitable apparatuses used by rubber manufacturers. However, in view of the choice of the constituents, it is much easier to obtain homogeneous mixtures with less powerful means and in a shorter time than for the preparation of customary organopolysiloxane compositions containing diorganopolysiloxane gums in place of the oils A.

In particular, roller mills cannot be used, which is an advantage because they are time-consuming and energy-consuming. On the other hand, it is possible to use kneaders, or cylindrical-tube mixers equipped with screws, operating continuously or batchwise; in these cylindrical-tube mixers, the screws rotate and can also be subjected to reciprocating movements.

The various constituents can be introduced into the above-mentioned apparatus in any order. Nevertheless, if the mixtures of the constituents are heated to temperatures above 60°–80° C., for example for the purpose of accelerating the wetting of the fillers B by the oils A (which makes it possible to reduce the residence time in the apparatus), it is then necessary to add the cross-linking agents D last, and only when the temperature of the mixtures has decreased to a suitable level.

The compositions obtained are pasty products of which the penetration value, measured in accordance with French Standard Specification T 60-132, ranges from 80 to 400 and in general from 90 to 370. They can therefore be handled easily and in particular can be introduced into the feed systems of molding machines by simply pumping using pumps, for example, piston pumps. They can then be hardened to form moldings or shaped articles of all shapes and sizes by traditional molding techniques, such as transfer molding, compression molding and injection molding, it being understood that the molding equipment utilized does not have to be as heavy and expensive as that used with the rubbery organopolysiloxane compositions (this heavy and expensive equipment is described, in particular, in W. Lynch, *Handbook of Silicon Rubber Fabrication*, pages 43 to 83); light molding equipment of the type used with low-viscosity and medium-viscosity plastics in the molten state is sufficient. The molds of the molding machines are typically raised to a temperature above 100° C. and below 250° C. during the operation for hardening the subject compositions.

The mechanical properties of the elastomers produced from the compositions of the present invention are good and only slightly inferior to those of the conventional silicone elastomers vulcanized under the influence of heat. These properties obviously vary, for example, according to the level of incorporation of the fillers B, but for Shore A hardnesses ranging from 40 to 80, it is possible to obtain tensile strengths which range from 6 to 8 MPa and even in excess of these values.

In order to further illustrate the present invention and the advantages thereof, the following specific examples are given, it being understood that same are intended only as illustrative and in nowise limitative.

EXAMPLE 1

The following ingredients were charged into a kneader:
(i) 100 parts of an $\alpha,\omega$-bis-(dimethylvinylsiloxy)-dimethylpolysiloxane oil having a viscosity of 100,000 mPa·s at 25° C.;
(ii) 4 parts of an $\alpha,\omega$-dihydroxydimethylpolysiloxane oil having a viscosity of 50 mPa·s at 25° C.;
(iii) 10 parts of a pyrogenic silica having a BET specific surface area of 200 m²/g, an average diameter of the primary particles of 21 nm and a bulk density of 50 g/liter; and
(iv) 35 parts of a precipitated silica having a BET specific surface area of 170 m²/g, a bulk density of 70 g/liter and an average diameter of the primary particles of 18 nm.

The mixture, after being subjected to efficient malaxation, was heated progressively to 150° C.; it was then malaxated at this temperature for 1 hour. After cooling to about 30° C., 2.25 parts of a paste formed by dispersing 50 parts of 2,4-dichlorobenzoyl peroxide in 50 parts of an $\alpha,\omega$-bis-(trimethylsiloxy)-dimethylpolysiloxane oil having a viscosity of 100 mPa·s at 25° C. were added.

The composition obtained, which was designated $P_1$, had a penetration, measured in accordance with French Standard Specification T 60-132 (corresponding to ASTM Standard Specification D-217-68), of 190. This composition $P_1$ was hardened to form 2 mm thick elastomer plates by heating same in a mold for 8 minutes at 115° C., under a pressure of 50 bars. One batch of these plates was heated for 4 hours at 200° C., in the ambient atmosphere, in a ventilated oven; another batch was heated under the same conditions for 10 days at 200° C.

The following properties were measured on these plates by taking standardized samples:
(1) Shore A hardness according to ASTM Standard Specification D 2240;
(2) tensile strength in MPa according to AFNOR Standard Specification T 46-002 (corresponding to ASTM Standard Specification D 412);
(3) elongation at break in % according to the above standard specification.

The results of the aforesaid measurements were as follows (the figures on the left relate to the plates heated for 4 hours at 200° C. and the figures on the right, in brackets, relate to the plates heated for 10 days at 200° C.):

| Shore hardness | 56 | (58) |
|---|---|---|
| Tensile strength | 7.5 MPa | (6.7 MPa) |
| Elongation at break | 510% | (390%) |

By way of comparison, the organopolysiloxane composition described in Example 1 of U.S. Pat. No. 3,791,998 was prepared. This composition was then hardened to form 2 mm plates by following the technique used for hardening composition $P_1$; one batch of the plates was heated for 4 hours at 200° C. in the ambient atmosphere, and another batch was heated for 10 days at 200° C. in the ambient atmosphere. The mechanical properties measured on these elastomer plates were as follows (only the measurements made on the plates heated for 4 hours at 200 QC are shown, the plates heated for 10 days at 200° C. having unmeasureable properties):
Shore A hardness: 35
Tensile strength: 0.9 MPa
Elongation at break: 160%

These values are very substantially inferior to those measured on the elastomer plates produced form composition $P_1$. Elastomers having such poor mechanical properties cannot be used by themselves and they must be supported by tough materials.

EXAMPLE 2

Ten other compositions, $P_2$ to $P_{11}$, were prepared in accordance with the method described in Example 1 for the manufacture of composition $P_1$.

However, modifications were effected as regards the amount by weight or the nature of the constituents used for preparing composition $P_1$. These modifications, and also the addition of other constituents, are indicated below:

COMPOSITION $P_2$

The 100 parts of the $\alpha,\omega$-bis-(dimethylvinylsiloxy)-dimethylpolysiloxane oil having a viscosity of 100,000 mPa·s at 25° C. were replaced by 100 parts of an oil which was similar but which had a viscosity of 50,000 mPa·s at 25° C.

COMPOSITION $P_3$

The 100 parts of the $\alpha,\omega$-bis-(dimethylvinylsiloxy)-dimethylpolysiloxane oil having a viscosity of 100,000 mPa·s at 25° C. were replaced by 100 parts of an oil which was similar but which had a viscosity of 14,000 mPa·s at 25° C.

COMPOSITION $P_4$

The 100 parts of the $\alpha,\omega$-bis-(dimethylvinylsiloxy)-dimethylpolysiloxane oil having a viscosity of 100,000 mPa·s at 25° C. were replaced by 100 parts of an $\alpha,\omega$-bis-(trimethylsiloxy)-diorganopolysiloxane oil having a viscosity of 100,000 mPa·s at 25° C., the diorganopolysiloxane chain of which was formed by $(CH_3)SiO$ and $CH_3(CH_2=CH)SiO$ units, the vinyl radicals representing 0.020% of the weight of the oil.

COMPOSITION P₅

The 35 parts of the precipitated silica having a BET surface area of 170 m²/g were replaced by 25 parts of the same silica.

COMPOSITION P₆

The 35 parts of the precipitated silica having a BET specific surface area of 170 m²/g were replaced by 15 parts of the same silica.

COMPOSITION P₇

The 35 parts of the precipitated silica having a BET specific surface area of 170 m²/g were replaced by 40 parts of the same silica; 0.5 part of the silane of the formula $CH_2=C(CH_3)COO(CH_2)_3Si(OCH_3)_3$ was also added.

COMPOSITION P₈

10 parts of grounnd quartz having an average particle diameter of 5 microns and a BET specific surface area of 7 m²/g were added to the constituents of P₁.

COMPOSITION P₉

50 parts of ground quartz having an average particle diameter of 5 microns and a BET specific surface area of 7 m²/g were added to the constituents of P₁.

COMPOSITION P₁₀

50 parts of ground quartz having an average particle diameter of 5 microns and a BET specific surface area of 7 m²/g, and 0.5 part of the silane of the formula $CH_2=C(CH_3)COO(CH_2)_3Si(OCH_3)_3$ were added to the constituents of P₁.

COMPOSITION P₁₁

The 35 parts of the precipitated silica having a BET specific surface area of 170 m²/g were replaced by 8 parts of the same silica; 7 parts of a pyrogenic silica having a specific surface area of 300 m²/g and treated with octamethylcyclotetrasiloxane were also added.

The penetrations of the compositions were measured, together with the mechanical properties of the elastomers produced by hardening these compositions. The measurement techniques and the hardening process were those described in Example 1 and the elastomer plates were heated for only 4 hours at 200° C. in the ambient atmosphere.

The results obtained were as follows:

TABLE I

|       | PENETRATION | SHORE A HARDNESS | TENSILE STRENGTH IN MPa | ELONGATION AT BREAK IN % |
|-------|-------------|------------------|-------------------------|--------------------------|
| P₂    | 185         | 57               | 7.5                     | 350                      |
| P₃    | 180         | 58               | 6.3                     | 280                      |
| P₄    | 175         | 55               | 6.2                     | 320                      |
| P₅    | 210         | 50               | 7.1                     | 500                      |
| P₆    | 270         | 43               | 5.5                     | 520                      |
| P₇    | 140         | 68               | 7.5                     | 270                      |
| P₈    | 175         | 58               | 7.6                     | 340                      |
| P₉    | 150         | 66               | 7.2                     | 240                      |
| P₁₀   | 130         | 73               | 8.1                     | 170                      |
| P₁₁   | 240         | 40               | 6.1                     | 570                      |

While the invention has been described in terms of preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A pasty organopolysiloxane composition of matter having a penetration ranging from 80 to 400, comprising an intimate admixture of:
   (A) 100 parts by weight of a diorganopolysiloxane oil having a viscosity of 500 to 300,000 mPa·s at 25° C., consisting essentially of recurring units of the formula $R_2SiO$ and blocked at each end of the chain by units of the formula $R_2R'SiO_{0.5}$, in which formulae the symbols R, which are identical or different, represent hydrocarbon radicals which are unsubstituted or substituted by halogen atoms or cyano groups and which have 1 to 8 carbon atoms, and the symbol R' represents the same radicals as the symbols R and also a hydroxyl radical, an alkoxy radical having from 1 to 4 carbon atoms or a β-methoxyethoxy radical;
   (B) 7 to 85 parts by weight of finely divided, reinforcing silicas having a specific surface area of at least 50 m²/g, said reinforcing silicas B comprising from 55 to 95% of precipitated silica and from 45 to 5% of pyrogenic silica;
   (C) 1 to 20 parts by weight of a structuring inhibitor; and
   (D) 0.1 to 4 parts by weight of an organic peroxide cross-linking agent.

2. The composition of matter as defined by claim 1, wherein the reinforcing silicas B comprise 60 to 90% of precipitated silica and from 40 to 10% of pyrogenic silica.

3. The compositions of matter as defined by claim 1 or 2, wherein up to 60% of the reinforcing silicas B is treated with an organosilicon compound providing $(CH_3)_2SiO$, $CH_3(CH_2=CH)SiO$, $(CH_3)_3SiO_{0.5}$ or $(CH_3)_2CH_2=CHSiO_{0.5}$ units attached to the surface thereof.

4. The composition of matter as defined by claim 3, wherein up to 55% of the reinforcing silicas B is treated with such organosilicon compound.

5. The composition of matter as defined by claim 1, further comprising, in an amount ranging from 0.05 to 5 parts by weight per 100 parts by weight of the constituent A, of an adjuvant selected from the group consisting of:
   (i) a silane of the formulae:

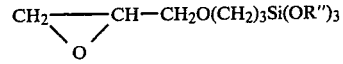

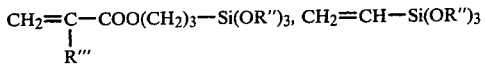

in which the symbols R" represent methyl, ethyl, n-propyl or β-methoxyethyl radicals and the symbol R''' represents a hydrogen atom or the methyl radical, and
   (ii) a product of partial hydrolysis or partial cohydrolysis of said silanes.

6. The composition of matter as defined by claim 3, further comprising, in an amount ranging from 0.05 to 5 parts by weight per 100 parts by weight of the constituent A, of an adjuvant selected from the group consisting of:

(i) a silane of the formulae:

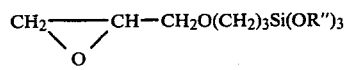

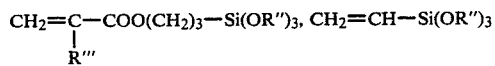

in which the symbols R" represent methyl, ethyl, n-propyl or β-methoxyethyl radicals and the symbol R'" represents a hydrogen atom or the methyl radical, and (ii) a product of partial hydrolysis or partial cohydrolysis of said silanes.

7. The composition of matter as defined by claim 1, said structuring inhibitor C comprising a diorganopolysiloxane oil having a viscosity ranging from about 5 to about 500 mPa·s at 25° C., and chain terminated with either a hydroxyl radical and/or an alkoxy radical having from 1 to 3 carbon atoms.

8. An elastomer comprising the thermoset composition of matter as defined by claim 1.

9. A shaped article comprising the elastomer as defined by claim 8.

* * * * *